United States Patent [19]

Carlow

[11] 4,353,613
[45] Oct. 12, 1982

[54] ELECTRICAL OUTLET CORD AND HOLDER

[75] Inventor: Arthur Carlow, Beverly, Mass.

[73] Assignee: Carico, Inc., Beverly, Mass.

[21] Appl. No.: 140,097

[22] Filed: Apr. 14, 1980

[51] Int. Cl.³ ............................................. H01R 13/58
[52] U.S. Cl. .................................................. 339/119 C
[58] Field of Search ........... 339/119 C, 147 C, 157 C; 191/12.4; 206/225, 331

[56] References Cited

U.S. PATENT DOCUMENTS

| | | | |
|---|---|---|---|
| 2,167,541 | 7/1939 | Young | 339/119 C |
| 2,231,001 | 2/1941 | Engstrom | 339/147 C |
| 3,013,105 | 12/1961 | Craig | 339/147 C |
| 3,714,616 | 1/1973 | Sample | 339/119 C |

FOREIGN PATENT DOCUMENTS 2259513  8/1975  France ........................... 339/119 C

*Primary Examiner*—Joseph H. McGlynn
*Attorney, Agent, or Firm*—Cesari and McKenna

[57] ABSTRACT

A terminated electrical cord holder wherein the holder is formed as a single sheet of light-weight plastic having the shape of a bobbin. The holder has a grid-like structure and a peripheral flange for rigidity. Also openings are formed at the opposite ends of the holder, one opening serving as a grip handle and the other opening exposing an electrical outlet. An electrical cord connected to that outlet can be wound about the holder for storage purposes. Preferably also a fastener is provided at the handle end of the holder for removably securing the free end of the cord to the holder.

10 Claims, 5 Drawing Figures

ELECTRICAL OUTLET CORD AND HOLDER

This invention relates to a holder for an electrical cord. It relates more particularly to such a holder which also incorporates an electrical outlet strip so that a plurality of electrical appliances can be plugged into the strip and be connected electrically by means of the cord unwound from the holder to a remote source of electrical current.

BACKGROUND OF THE INVENTION

In many instances as when working in a large room or outdoors, it becomes necessary to use an electrical appliance such as a power tool. Because the electrical cord on the particular appliance is usually not long enough, an extension cord is often required to connect that appliance to the nearest "live" electrical outlet. It frequently happens that when one goes to use an available extension cord, the cord is twisted and tangled so that a considerable amount of time and effort must be spent straightening it out before it can be used.

To avoid that problem, it has been proposed to store a length of electrical cord on a holder with the cord terminating in a male or female electrical plug supported by the holder. The cord is wound about the holder and when it is necessary to use the cord, only an amount sufficient to stretch between the electrical appliance and the electrical outlet is unwound from the holder. In this way, the electrical cord is kept in reasonably good condition and remains free of knots and tangles.

Holders such as this can be broken down generally into two different types. In the first type illustrated in U.S. Pat. Nos. 2,167,541; 2,204,939 and 2,561,240, the holder is in the form of a spool or bobbin about which the cord is coiled. An electrical connector mounted to the holder is intended to plug directly into an electrical outlet. This being the case, the length of cord that can be coiled on the holder is quite limited. If the cord is too long, then the holder will not nest properly against the wall or other surface permitting the plug to project sufficiently into the electrical outlet to establish an electrical connection therewith.

Furthermore, many of the holders of that type are relatively expensive to make. This stems primarily from the fact that the holder is actually molded or formed around the conductive elements of the plug so that relatively sophisticated jigs and fixtures are required to form the finished holder.

The other type of holder typified by the one depicted in U.S. Pat. No. 3,290,453 does not plug directly into an electrical outlet. Therefore, the holder itself can be relatively large and carry a considerable length of cord. The free end of the cord, which can be unwound from the holder, is terminated by a male electrical plug which plugs into the wall outlet and the other end of the cord is connected electrically to an electrical outlet mounted on the holder. However, this type of arrangement is disadvantaged in that the holder itself is invariably composed of a relatively large number of separate metal parts which must be connected together. Also a standard electrical outlet box containing an outlet must be anchored to the holder. Consequently, the overall holders of that type are quite expensive to make. Furthermore, they are quite heavy and bulky and therefore troublesome to transport on the job.

SUMMARY OF THE INVENTION

Accordingly, the present invention aims to provide an improved holder for an electrical extension cord.

Another object of the invention is to provide such a holder which can accommodate a plurality of electrical appliances at the same time.

A further object of the invention is to provide an electrical cord holder and outlet combination which is relatively easy and inexpensive to manufacture.

Still another object of the invention is to provide a combination of this type which is light-weight, compact and easy to carry and to store.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

Briefly, my holder is constructed for the most part of a suitable rugged, impact-resistant plastic such as polypropylene. The holder is molded in the shape of a large flat spool or bobbin. As such, it has enlarged shell-like ends and an intervening waist in the form of an open grid about which an electrical cord may be wound. The edge margin of the holder and the webs of the grid are formed at right angles to the general plane of the holder, creating a peripheral skirt or flange all around the rear face of the holder surrounding the grid which construction greatly rigidifies the holder and tends to prevent it from racking.

Also, formed in the holder at one enlarged end thereof is a transverse opening which defines a grip or handle to facilitate carrying the holder. Laterally extending walls project out from the rear face of the holder all around the grip opening more or less the same distance as the skirt so that those walls also help to rigidify that end of the holder.

Formed at the opposite enlarged end of the holder is a transverse trough or pocket which is arranged to receive an electrical outlet strip. Each plug-receiving electrical outlet on the strip is exposed in an opening extending through the bottom wall of the pocket through the front face of the holder so that each such outlet is readily accessible to receive a plug inserted at the front face of the holder.

One end of the electrical cord to be wound around the holder extends into the pocket and is connected electrically to the outlets. A cover is removably secured over the entrance to the pocket to electrically and mechanically shield the outlet strip. Further, the covered pocket and the strip form a box girder which helps to strengthen that end of the holder. The opposite end of the cord is terminated by a conventional male plug.

In use, the electrical cord is normally wound about the waist of the holder with its plug end removably secured to the holder by a clip formed adjacent to the holder handle. When it is desired to connect an electrical appliance to a remote outlet, the plug end is unclipped and a sufficient length of cord is unwound from the holder and plugged into that outlet. The holder carrying the remaining unwound length of cord may then be positioned on the floor or ground adjacent the appliance to be used. Thus only the required amount of cord stretches across the floor or ground so that there is little likelihood of its becoming twisted or knotted. When the particular appliance is no longer needed, the cord can simply be wound up again on the holder and the holder put away or hung by its handle on a suitable hook.

Although it may be most desirable to mold the skirted holder and its pocket cover separately, they may also be molded as a single blank. Then the holder per se and the cover may be trimmed from the blank and suitably connected using conventional cutting and fastening operations. In any event, the costs of making and assembling the holder are kept to a minimum. Yet the holder, complete with cord and electrical outlet, are lightweight and easy to carry about and use. Therefore, the holder should find wide application in the home and in industrial plants where it is often necessary to connect electrical appliances to remote power sources.

BRIEF DESCRIPTION OF THE DRAWING

For a fuller understanding of the nature and objects of the invention, reference should be had to the following detailed description, taken in connection with the accompanying drawing, in which.

DESCRIPTION OF THE PREFERRED EMBODIMENT

Figure 1:
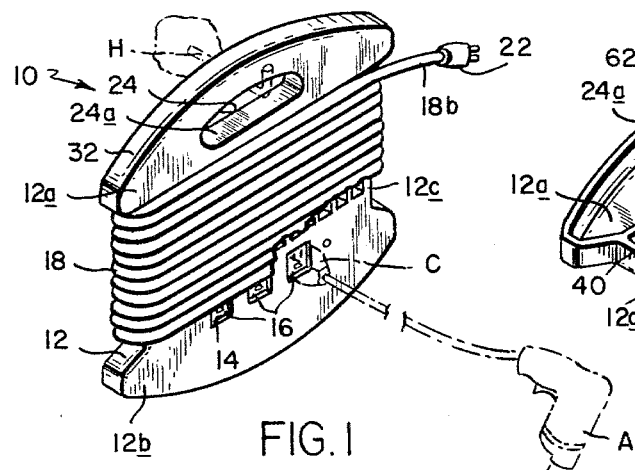
FIG. 1 is a perspective view from the front with parts cut away of an electrical cord and holder combination made in accordance with this invention.

Referring to FIG. 1 of the drawing, my cord and holder combination is indicated generally at 10. It comprises a large generally, flat bobbin-like holder 12 molded of a suitable rugged, impact-resistant plastic such as polypropylene. The enlarged top and bottom ends 12a and 12b of the holder are separated by a relatively narrow waist section 12c.

A plurality of openings 14, i.e. three, are formed in the enlarged bottom end of the holder for receiving a corresponding number of grounded electrical outlets 16 which are slightly recessed but readily accessible through those openings so that the electrical connectors C of various electrical appliances A (one being shown in dotted lines) can be plugged into those outlets at the front face of the holder. Connected electrically in parallel to the outlets 16 is one end 18a (FIG. 2) of a long three-wire electrical cord 18. Normally, that cord is wound about the waist section 12c of the holder as shown in FIG. 1. The opposite end 18b of cord 18 is transmitted by a conventional grounded male electrical plug 22.

Formed in the enlarged upper end 12a of the holder above the wrap of cord 18 is a laterally extending slot or opening 24. By means of that opening, one can conveniently carry the holder and its wrapped cord. Also, when the holder is not being used, it can be hung from a hook shown in dotted lines at H in FIG. 1 which hook projects through opening 24.

Figure 2:
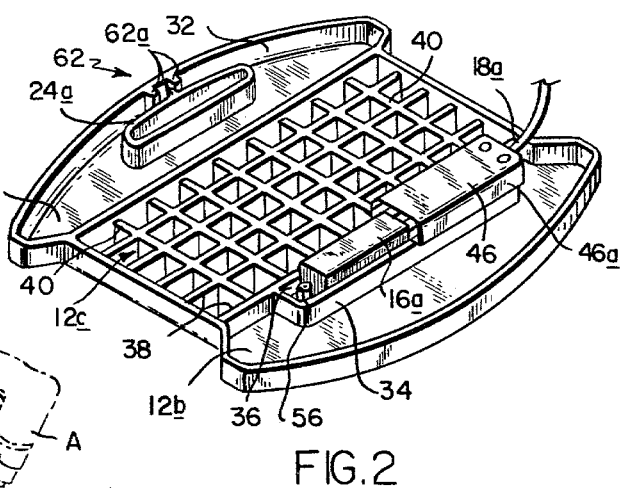
FIG. 2 is as perspective view from the rear thereof on a larger scale and with parts cut away.

Referring now to FIG. 2 of the drawing, the holder 12 is formed with a peripheral flange 32 projecting at right angles from the rear face of the holder. The flange 32 not only presents a relatively smooth surface to the cord 18 wound about the holder waist section 12c, but it also functions as a rigidifying flange which inhibits the tendency of the holder to twist and rack.

Likewise, the grip opening 24 is formed with a skirt or flange 24a extending all around that opening. That flange projects out from the same face of the holder as flange 32 to approximately the same extent. Thus, the flange 24a provides a smooth gripping surface for the hand and it also tends to rigidify the upper end 12a of the holder.

Still referring to FIG. 2, a wall or flange 34 is formed in the enlarged bottom end 12b of the holder. The wall 34 surrounds the area of the outlet openings 14 and projects out from the rear face of the holder approximately the same distance as flange 24a and skirt 32. The wall 34 thus defines with the face of the holder, a generally rectangular transverse trough or pocket 36 which contains an electrical outlet strip 16a whose three outlets 16 are exposed through the openings 14 as shown in FIG. 1.

Figure 4:
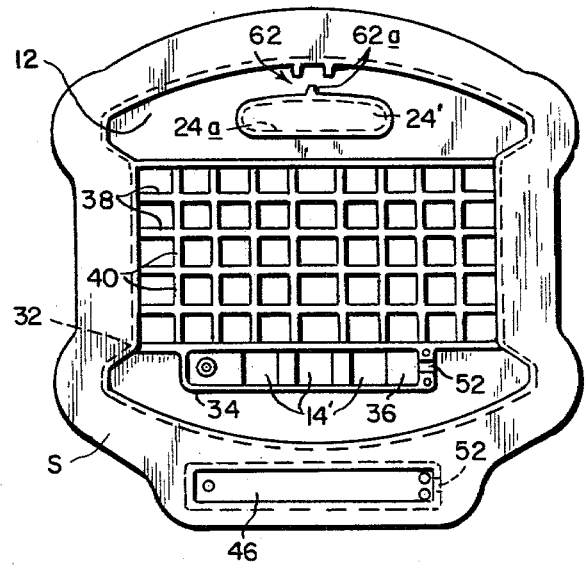
FIG. 4 is a similar view of the opposite face of the blank.

Referring now to FIGS. 2 and 4, the waist section 12c of the holder is formed as a rectangular grid comprising a series of spaced-apart lateral ribs or webs 38 extending between the flange 32 segments at the opposite sides of the holder, one such web coinciding with the wall 34 at the side of pocket 36. The grid also includes a series of spaced-apart longitudinal ribs or webs 40 intersecting the lateral ones and extending between the pocket 36 and the lateral rib 38 adjacent handle 24. The grid extends all the way through the holder and its webs are substantially the same height as the flange 32. Therefore it lends a tremendous amount of strength and rigidity to the holder without adding appreciably to its weight.

Figure 5:
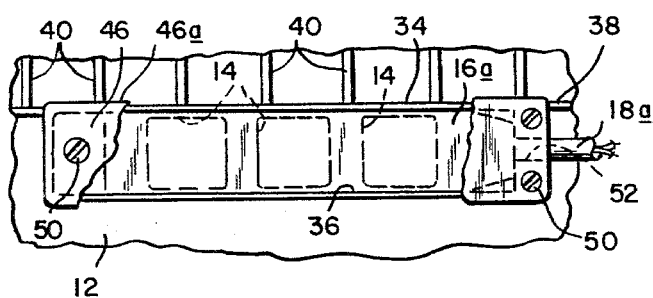
FIG. 5 is a fragmentary plan view with parts broken away showing the FIG. 1 holder in greater detail.

As best seen in FIGS. 2 and 5, the electrical strip 16a is completely enclosed within the pocket 36 by means of a generally rectangular cover 46 which engages over the entrance to the pocket. Cover 46 has the same shape as the pocket, i.e. rectangular, and has side and end walls 46a which are arranged to engage over the edge of wall 34. The end 18a of the electrical cord connected to the outlet strip 16a is led out of pocket 36 through registering openings 52 formed in end walls of the pocket and the cover. The cover is removably secured over the pocket by appropriate threaded fasteners 50 extending through the cover and turned down into holes formed in the end wall of the pocket adjacent cord 18 and in an upstanding post 56 (FIG. 2) at the opposite end of the pocket.

Thus the covered pocket 36 and the rigid outlet strip 16a therein form a very rigid transverse rib which greatly strengthens the lower end of the holder.

After the outlet strip 16a is secured to the holder as aforesaid, the cord, fitted with the male plug 22 at its opposite end 18b, can be wound about the waist section 12c of the holder as shown in FIG. 1. Also, as shown in FIG. 2, a clip shown generally at 62 is formed in the upper end 12a of the holder between handle flange 24a and flange 32 to secure the free end of cord 18. The clip specifically illustrated is a set of three staggered tabs 62a molded into the holder and between which the cord 18 can be removably engaged.

When it is necessary to connect an appliance A, such as a power tool, to an electrical outlet at a remote location, the cord is disengaged from clip 62 and the plug 22 is plugged into the electrical outlet. Then a sufficient amount of cord 18 is unwound from the holder to reach the electrical appliance. The holder can then simply be placed on the ground or floor near the appliance and the appliance's connector C can be plugged into an outlet 16 on the holder. When the particular job is completed, the appliance is disconnected from outlet 16, the cord 18 is rewound on the holder, the plug 22 is removed from the outlet and the holder returned to its storage location on a shelf or on hook H as shown in FIG. 1. Thus there is little likelihood of the cord 18 becoming knotted or twisted.

Figure 3:
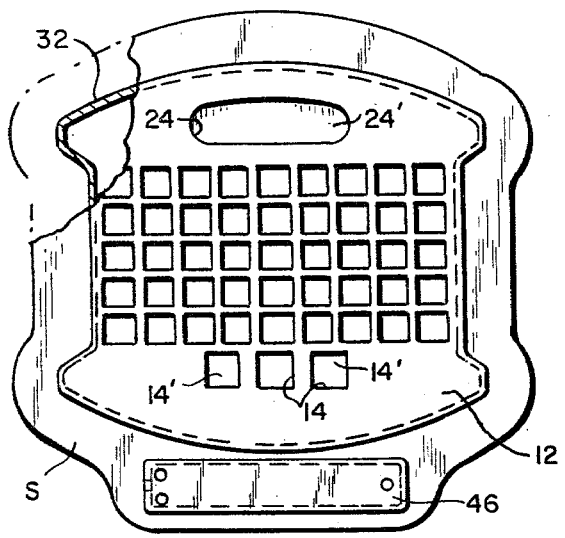
FIG. 3 is a plan view of the blank from which the FIG. 1 holder may be made.

Referring now to FIGS. 3 and 4, the holder 12 and the cover 46 may be molded together in a single plastic sheet S. Then the holder and cover may be cut from that sheet around flanges 32 and 34. In that event, areas 24' and 14' of the sheet are knocked out to provide the grip opening 24 and the plug openings 14. Whether the holder 12 and cover 46 are molded separately or together, the holder as a whole is quite inexpensive to make in large quantity. Furthermore, even though the holder is flat and very light-weight, it is quite strong and rugged due to the various rigidifying webs, walls and flanges described above. Therefore, the combined holder and cord are easy to carry around and use as compared with prior comparable cord carriers of this general type. Accordingly, it should be very useful whenever it becomes necessary to connect an electrical appliance to a remote power source.

It will thus be seen that the objects set forth above, among those made apparent from the preceding description, are efficiently attained. Also certain changes may be made in the above construction without departing from the scope of the invention. For example, other means such as laterally projecting noses or lateral notches or slots may be formed in the sides of the holder near the ends thereof to prevent the bights of the wound core 18 from sliping off the ends of the holder. Therefore, it is intended that all matter contained in the above description or shown in the accompanying drawing be interpreted as illustrative and not in a limiting sense.

It is also to be understood that the following claims are intended to cover all of the generic and specific features of the invention herein described.

What is claimed as new and desired to be secured by Letters Patent of the United States is:

1. In combination, a terminated electrical cord and holder therefor, said holder comprising a relatively large, thin bobbin formed as a unitary plastic piece and having a pair of enlarged ends and an intervening narrower waist, said waist being formed as a grid extending through the holder whose webs project substantially perpendicularly to the general plane of the holder; means defining a grip opening in one enlarged end of the holder; means defining one or more openings in the other enlarged end, electric outlet means mounted to said other end, said outlet means having the plug-receiving portions thereof exposed in said openings in said other end, and a length of electrical cord having one end electrically connected to said outlet means and having its opposite end terminating in an electrical connector, said cord being arranged to be wound around the waist of the holder.

2. A holder for a terminated electrical cord comprising a relatively large, thin bobbin formed as a unitary plastic piece and having a pair of enlarged ends and an intervening narrower waist, said waist being formed as a grid extending through the holder whose webs project substantially perpendicularly to the general plane of the holder; means defining a grip opening in one enlarged end of the holder; means defining one or more electrical outlet-exposing openings in the other enlarged end, said cord being arranged to be wound around the waist of the holder.

3. The combination defined in claim 2 wherein the winding section is narrower than the end sections.

4. The combination defined in claim 2 and further including means formed at said one end of the holder for removably securing the free end of the cord.

5. The holder defined in claim 2 and further including a peripheral flange formed all around the holder, said flange projecting in the same general direction as the webs of the grid.

6. The holder defined in claim 2 and further including means defining a pocket in register with the openings in the other end of the holder for receiving electrical outlet means, a cover for the pocket, and means for securing the cover over the pocket.

7. In combination, a terminated electrical cord and holder therefor for use at a site relatively remote from a live electrical outlet, said holder comprising a relatively large, thin bobbin having a pair of end sections and an intervening winding section, said winding section being formed as a grid whose webs project out substantially perpendicularly to the general plane of the holder; a peripheral flange formed integrally with the holder, said flange projecting out in substantially the same direction as said webs; means defining a grip at one end section of the holder; means defining one or more openings in the other end section of the holder; electrical outlet means mounted to said other end section, said outlet means having the plug-receiving portions thereof exposed through the openings in said other end section; a length of electrical cord having one end electrically connected to said outlet means and having its opposite end terminating in an electrical connector, said cord being arranged to be wound perpendicular to the longitudinal axis of the bobbin about the flanged winding section of the holder, and means for inhibiting the bights of the wound cord from slipping off the ends of said winding section.

8. The combination defined in claim 7 and further including another flange formed integrally in the holder and surrounding the area of the holder containing said outlet openings, said other flange extending from the holder in the same general direction as said peripheral flange and defining a pocket for said outlet means.

9. The combination defined in claim 8 and further including a cover for the entrance to said pocket, and means for securing the cover to the pocket flange.

10. In combination, a terminated electrical cord and holder therefor for use at a site relatively remote from a live electrical outlet, said holder comprising a relatively large, thin bobbin having a pair of end sections and an intervening winding section; a peripheral flange formed integrally with the holder, said flange projecting substantially perpendicularly to the general plane of the holder; means defining a grip at one end section of the holder, said grip-defining means comprising an internal opening in said one section and a second flange surrounding said grip opening, said second flange extending in the same general direction as said peripheral flange, means defining one or more openings in the other end section of the holder; electrical outlet means mounted to said other end section, said outlet means having the plug-receiving portions thereof exposed through the openings in said other end section; a length of electrical cord having one end electrically connected to said outlet means and having its opposite end terminating in an electrical connector, said cord being arranged to be wound perpendicular to the longitudinal axis of the bobbin about the flanged winding section of the holder, and means for inhibiting the bights of the wound core from slipping off the ends of said winding section.

* * * * *